UNITED STATES PATENT OFFICE.

PERCY F. COWING, OF NEW YORK, N. Y., ASSIGNOR OF ONE-HALF TO PIERRE DE PEYSTER RICKETTS, OF NEW YORK, N. Y.

PROCESS OF TREATING ACID LEACHING SOLUTIONS.

No. 825,302.          Specification of Letters Patent.          Patented July 10, 1906.

Application filed January 24, 1905. Serial No. 242,518.

*To all whom it may concern:*

Be it known that I, PERCY F. COWING, a citizen of the United States, and a resident of the borough of Manhattan, in the city, county, and State of New York, have invented certain new and useful Improvements in Processes of Treating Acid Leaching Solutions, of which the following is a specification.

This invention relates to a process of treating pyrites containing iron in addition to other metals—such, for example, as copper and the like—which are incapable of going into or of remaining in a mineral-acid solution in the presence of hydrogen sulfid.

In carrying out my process I fuse a quantity of pyrites of the character above specified in the presence of metallic iron under a suitable air or oxygen excluding cover—such, for example, as sodium chlorid—the pyrites and metallic iron being mixed in such proportion as to secure the minimum amount of residue insoluble in a solution of a mineral acid—such, for example, as hydrochloric or sulfuric acid. After having fused the pyrites and metallic iron in the manner specified I treat the resulting product to the action of a suitable mineral acid or a mineral-acid solution. In carrying out my process commercially the mineral-acid solution which I prefer to use for treating the resulting product of the fusion of pyrites in the presence of metallic iron, as described, is an acid leaching solution such as is secured, for example, in the treatment of some copper-bearing ores. The effect of the treatment of the resulting product above mentioned, which is in the nature of an iron-sulfur compound with a mineral acid or mineral-acid solution, is that hydrogen sulfid is evolved, the iron goes into solution, and the copper and other metals either remain out of solution or if they go into solution they are immediately precipitated on account of the presence of the hydrogen sulfid. Furthermore, where, for instance, a copper leaching solution is used as the mineral acid for treating the resulting product, not only the copper in the resulting product remains undissolved or is immediately precipitated if dissolved, but also the copper in the leaching solution is precipitated. My process therefore secures from the pyrites the maximum amounts of iron and other metals, as well as any similar metal or metals which may be contained in the acid solution, and hydrogen sulfid is evolved.

In carrying out my process I find it advantageous to use the pyrites and metallic iron in approximately the proportions of eighty-five to ninety per cent. of pyrites to ten to fifteen per cent. of metallic iron.

This method of producing an iron-sulfur compound which readily gives off $H_2S$ is particularly advantageous in the treatment of acid leaching solutions from copper-bearing ores, as before described. The copper, as well as the gold or silver, if any, is precipitated as a sulfid.

It is obvious that in the commercial application of my process the ordinary and well-known means may be employed, which it is therefore unnecessary for me to illustrate or describe.

By the phrase "mixed with metallic iron" as used in the claim I include the production of such metallic iron, if desirable, as by the addition of a ferric oxid and a suitable reducing agent.

Having thus described my invention, what I claim, and desire to secure by Letters Patent, is—

A process of treating pyrites containing iron in addition to metals incapable of remaining in a mineral-acid solution in the presence of hydrogen sulfid, which consists in fusing said pyrites in the presence of metallic iron and in the absence of air or oxygen, and finally subjecting the product produced by such fusion to the action of an acid leaching solution containing a metal whose sulfid is insoluble in the acid in the presence of hydrogen sulfid, whereby hydrogen sulfid is evolved, the iron goes into solution, and the other metals in the product and leaching solution are precipitated or left out of solution.

In testimony whereof I have signed this specification in the presence of two subscribing witnesses.

PERCY F. COWING.

Witnesses:
     E. VAN ZANDT,
     A. L. O'BRIEN